US012783872B2

(12) United States Patent
Tan et al.

(10) Patent No.: US 12,783,872 B2
(45) Date of Patent: Nov. 3, 2026

(54) MINIMUM BAYES RISK DECODING WITH NEURAL QUALITY METRICS

(71) Applicant: Google LLC, Mountain View, CA (US)

(72) Inventors: Qijun Tan, Falls Church, VA (US); Markus Freitag, Los Altos, CA (US); David Grangier, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 907 days.

(21) Appl. No.: 17/673,714

(22) Filed: Feb. 16, 2022

(65) Prior Publication Data

US 2023/0259759 A1 Aug. 17, 2023

(51) Int. Cl.
*G06N 3/08* (2023.01)

(52) U.S. Cl.
CPC .................................... *G06N 3/08* (2013.01)

(58) Field of Classification Search
CPC ........................................................ G06N 3/08
See application file for complete search history.

(56) References Cited

PUBLICATIONS

Eikema, Bryan, and Wilker Aziz. "Is Map decoding all you need? the inadequacy of the mode in neural machine translation." arXiv preprint arXiv:2005.10283 (2020). (Year: 2020).*
Kocmi, Tom, et al. "To ship or not to ship: An extensive evaluation of automatic metrics for machine translation." arXiv preprint arXiv:2107.10821 (2021). (Year: 2021).*
Freitag et al., "High Quality Rather than High Model Probability: Minimum Bayes Risk Decoding with Neural Metrics", arXiv:2111.09388v3, https://doi.org/10.48550/arXiv.2111.09388, 15 pages.

* cited by examiner

*Primary Examiner* — Li B. Zhen
*Assistant Examiner* — Griffin Tanner Bean
(74) *Attorney, Agent, or Firm* — DORITY & MANNING, P.A.

(57) ABSTRACT

Provided are systems and methods for sequence-to-sequence modeling with neural quality metrics. More particularly, example aspects of the present disclosure relate to minimum bayes risk (MBR) decoding with neural metrics for machine translation. According to example aspects of the present disclosure, a set of candidate outputs can be sampled from a machine translation model given a source sequence. Given the set of candidate outputs, systems and methods according to example aspects of the present disclosure can select a hypothesis with high expected utility with respect to the distribution over a set of pseudo-references from the machine translation model.

18 Claims, 5 Drawing Sheets

MINIMUM BAYES RISK DECODING WITH NEURAL QUALITY METRICS

FIELD

The present disclosure relates generally to machine-learning. More particularly, the present disclosure relates to minimum bayes risk decoding with neural quality metrics.

BACKGROUND

Sequence-to-sequence models can be used in machine-translation. These models produce a target sentence based on a source sentence. For instance, some of these models estimate probability of the target sentence given the source sentence. Some existing systems and methods approximate a maximum-a-posteriori (MAP) with beam search to output the target sentence with high probability. This approach assumes that the target sentences with high probability should also be the highest quality sentences.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for translating a source sequence with improved quality. The method includes obtaining, by a computing system comprising one or more computing devices, a plurality of candidate outputs based at least in part on a source sequence. The method includes determining, by the computing system, a plurality of reference utilities for each candidate output by a neural utility metric model and based on a reference set comprising a plurality of reference translations, the neural utility metric model configured to determine a utility of a candidate translation based at least in part on a reference translation. The method includes determining, by the computing system, an average utility of each candidate output of the plurality of candidate outputs based at least in part on the plurality of reference utilities. The method includes determining, by the computing system, an output sequence based at least in part on the average utility of each candidate output of the plurality of candidate outputs.

Another example aspect of the present disclosure is directed to a computing system that includes one or more processors and one or more non-transitory, computer-readable media storing instructions that, when implemented, cause the one or more processors to perform operations. The operations include: obtaining a plurality of candidate outputs based at least in part on a source sequence; determining a plurality of reference utilities for each candidate output by a neural utility metric model and based on a reference set comprising a plurality of reference translations, the neural utility metric model configured to determine a utility of a candidate translation based at least in part on a reference translation; determining an average utility of each candidate output of the plurality of candidate outputs based at least in part on the plurality of reference utilities; and determining an output sequence based at least in part on the average utility of each candidate output of the plurality of candidate outputs.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
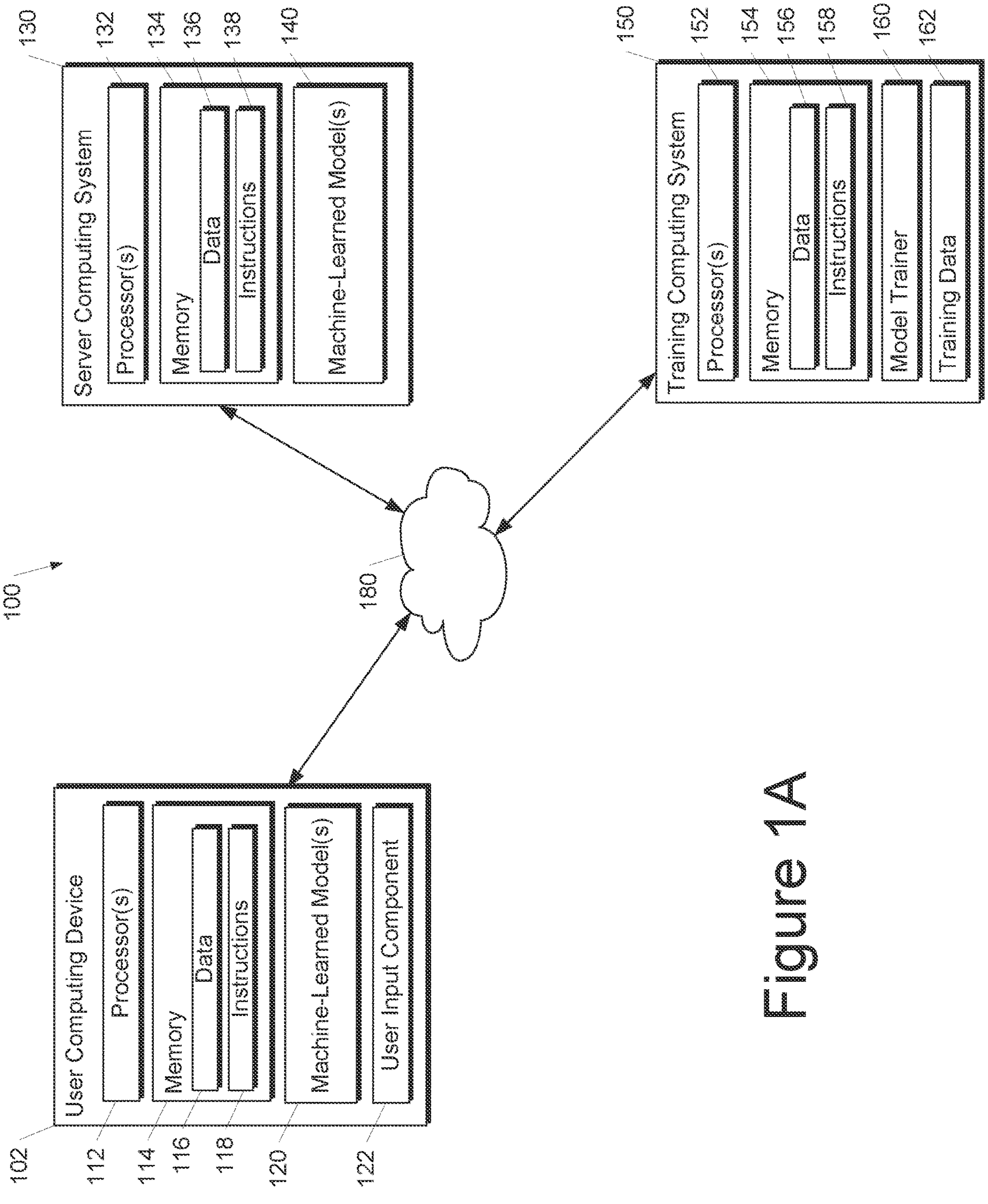
FIG. 1A depicts a block diagram of an example computing system that performs sequence-to-sequence modeling with neural quality metrics according to example embodiments of the present disclosure.

Reference numerals that are repeated across plural figures are intended to identify the same features in various implementations.

DETAILED DESCRIPTION

Generally, the present disclosure is directed to systems and methods for sequence-to-sequence modeling with neural quality metrics. More particularly, example aspects of the present disclosure relate to minimum bayes risk (MBR) decoding with neural metrics for machine translation. According to example aspects of the present disclosure, a set of candidate outputs can be sampled from a machine translation model given a source sequence. Given the set of candidate outputs, systems and methods according to example aspects of the present disclosure can select a hypothesis with high expected utility with respect to the distribution over a set of pseudo-references from the machine translation model. This set of pseudo-references can be the same as the set of candidate outputs. The utility can be evaluated for each candidate output by a neural utility metric model, such as BLEURT or COMET. The neural utility metric model can produce utility estimates that are highly correlated to human evaluation of the hypotheses, which in turn can provide for selecting a high quality translation.

Neural sequence-to-sequence models are useful in machine translation. These models can produce target sequences based on source sequences. For instance, some sequence-to-sequence models can estimate probability of a target sequence given a source sequence. Some existing approaches approximate a maximum-a-posteriori (MAP)

using beam search. This approach can output the target sequence with the highest (or near-highest) probability given the source sequence.

As one example, some existing approaches employ a beam search approach utilizing a probability model configured to assign a probability to a (source, target) pair. Training the probability model is focused on maximizing the probabilities. The approach utilizes a heuristic search to find the target with maximum probability, where the probability of an output sequence is at least based on an average probability of each token in the sequence. In translation contexts, this approach provides that less-frequently used words score lower due to their low probability, which in turn can reduce the probability of sentences including the less-frequently used words. Thus, sentences comprised entirely of high-probability words, which are generally simple and literal, will be output by the model even if a human translator would more likely choose a less-frequent word in the context of the sentence.

This approach assumes that the probability, as estimated by beam search, correlates to translation quality (e.g., as measured by a human observer). However, estimated probability from some existing approaches and translation quality are not always correlated. For instance, some translations generated by beam search may be ranked below human translations in evaluations. As another example, the machine translation model may consider its own predictions more likely than human translations. Thus, translations produced by some existing approached may have decreased quality.

Example aspects of the present disclosure provide for mitigating these and other problems. For instance, systems and methods according to example aspects of the present disclosure can utilize neural utility metrics, such as BLEURT, COMET, etc. in evaluating utility of candidate translations. Neural utility metrics provide higher correlation to human judgements compared to some existing metrics, such as overlap-based metrics such as BLEU or METEOR. In addition, some neural metrics can have improved correlation to human judgements compared to approaches that measure overlap in a neural embedding space, such as YiSi. For instance, BLEURT and COMET can reward hypotheses with varied word choice, sentence structure, length, or other characteristics from the reference translations. Thus, these neural utility metrics may select translations that better reflect human translations than some existing approaches.

Example aspects of the present disclosure can provide for a computer-implemented method for translating a source sequence with improved quality. The computer-implemented method can be implemented by any suitable computing system, such as a computing system including one or more processors and/or one or more non-transitory, computer-readable media.

The computer-implemented method can include obtaining a plurality of candidate outputs based at least in part on a source sequence. In some implementations, the source sequence can be or can include text data including one or more sentences. In some implementations, the plurality of candidate outputs can be or can include a plurality of candidate translation outputs. For instance, a set of hypotheses can be sampled from a machine translation model. In some implementations, obtaining the plurality of candidate outputs includes inputting the source sequence into a machine-learned translation model configured to estimate the probability of a target segment given a source segment and receiving the plurality of candidate outputs as output from the machine-learned translation model. For instance, the machine-learned translation model $P_{model}(y|x)$ can estimate the probability of a target segment y given a source segment x. For instance, in some implementations, the machine-learned translation model can be or can include a transformer model. A plurality of candidate outputs (e.g., target segments) can be obtained from the source segment by repeatedly sampling from the model (e.g., by ancestral sampling). In some implementations, the plurality of candidate output can be obtained by random sampling. For instance, a sequence of tokens can be sampled one after the other contingent on the prior sampling. This can ensure that tokens are initially selected such that lower-probability tokens which may ultimately be higher quality are included in the initial sample set of candidate outputs.

The computer-implemented method can include determining a plurality of reference utilities for each candidate output by a neural utility metric model and based on a reference set comprising a plurality of reference translations. For instance, in some cases, it would be desirable to select the best candidate output based on its utility with respect to a distribution over human reference translations. However, the distribution over human reference translations may be unknown. For instance, it may not be possible to obtain human reference translations. Thus, a distribution over samples from the machine-learned translation model can provide a good approximation of the human reference translation distribution. Because it is intractable to integrate over the space of all sequences, a set of pseudo-references is sampled from the machine-learned translation model to act as the reference set. In some implementations, the reference set can be or can include the plurality of candidate outputs. For instance, the same set can be used as the candidates and the distribution.

The neural utility metric model can be configured to determine a utility of a candidate translation based at least in part on a reference translation. For instance, in some implementations, the neural utility metric model can receive as input a pair including a candidate translation and a reference translation. The neural utility metric model can output, in response to receiving the input pair, a utility score associated with the candidate translation and based on the reference translation. For instance, if the reference translation is a human translation, the neural utility metric model can score how well the candidate translation reflects the human translation. Intuitively, this may be a measure of how "believable" or "accurate" the candidate translation is. According to example aspects of the present disclosure, the neural utility metric model can include one or more neural networks such that the neural utility metric model is a machine-learned metric. The neural utility metrics can have improved correlation with human judgement.

Examples of neural utility metric models include the BLEURT metric and the COMET metric. For instance, utility metrics such as BLEURT or COMET may rank a human translation higher than translations from machine-learned translation models. The neural utility metric models can include so-called "first generation" neural utility metric models, which use neural models to extract pretrained sentence and word representations to compute distances indicative of semantic proximity, such as BertScore and/or YiSi. The neural utility metric models may also be so-called "second generation" models, including BLEURT and COMET, which fine-tune the neural models on human judgements, such as through regression or ranking tasks.

In some implementations, the neural utility metric may be a reference metric between two sentences in a common language. As one example, the BLEURT metric can include a so-called "reference metric" that scores how appropriate a hypothesis translation is by measuring similarity between the translation and a reference sentence in the same language. According to example aspects of the present disclosure, the BLEURT metric can be used such that each of the other candidate translations is used as the reference sentence for the candidate translation-hypothesis, and the performance over all candidate translations can be averaged. For instance, in some implementations, the hypothesis translation and the reference sentence are inputs to a neural network that outputs an embedding indicative of how similar the sentences are. In some implementations, the portion of the neural network that is associated uniquely with the hypothesis translation can be preserved across one or more instances of the BLEURT metric for the hypothesis translation. For instance, some portion of the neural network may have common results across all instances of BLEURT for a given hypothesis because they are unrelated to the reference sentence, and those portions can be stored in memory such that they are not recomputed for each instance. This can provide for reduced computing resource usage over determining the plurality of reference utilities. For instance, computing resource usage may be reduced compared to approaches that concatenate the hypothesis translation to the reference sentence and compute the entirety of the neural network for each instance. As another example, the COMET metric can calculate a sentence embedding for the hypothesis translation and provide that sentence embedding as input to a neural network. Neural utility metrics can be computationally expensive, in some scenarios, and many existing approaches have failed to recognize their use in sequence-to-sequence modeling.

The computer-implemented method can include determining an average utility of each candidate output of the plurality of candidate outputs based at least in part on the plurality of reference utilities. In some implementations, determining the average utility of each candidate output can include averaging the plurality of reference utilities for each candidate output. For example, in some implementations, the neural utility metric model can output a utility score for each candidate translation paired with each of the other candidate translations as a reference translations to collect a plurality of reference utilities for the given candidate translation. This plurality of reference utilities can be averaged such that the average utility reflects the utility score over all candidate outputs. This average utility score thus serves as a proxy for the utility over human references.

The computer-implemented method can include determining an output sequence based at least in part on the average utility of each candidate output of the plurality of candidate outputs. For instance, in some implementations, determining the output sequence can include selecting the candidate output of the plurality of candidate outputs with the highest average utility as the output sequence. Once the average utility is determined for each candidate output, the candidate output with the highest average utility can be selected as the hypothesis with the best utility over the distribution of candidate outputs. For instance, in some implementations, the output sequence can include a translation of the text data from the source sequence. According to example aspects of the present disclosure, the output sequence will have improved quality and correlation to human translations than those produced by some existing systems.

Systems and methods according to example aspects of the present disclosure can provide for a number of technical effects and benefits, including improvements to computing technology. For instance, systems and methods according to example aspects of the present disclosure can provide for improved quality of machine translations. As an example, some systems and methods according to example aspects of the present disclosure can produce translations that are less likely by conventional approaches, such as translations that are lexically different from those produced by other approaches, but are more accurate to those produced by human translators. For instance, one example implementation according to example aspects of the present disclosure can provide for unexpectedly improved quality with a neural utility metric and ancestral (e.g., random) sampling. As an example, neural utility metric models can provide improved performance over, for example, quality estimation metrics, overlap-based metrics, etc.

With reference now to the Figures, example embodiments of the present disclosure will be discussed in further detail.

FIG. 1A depicts a block diagram of an example computing system 100 that performs sequence-to-sequence modeling with neural quality metrics according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. The machine-learned models 120 can include, for example, machine-learned translation models, neural utility metric models and component models thereof, etc. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel sequence-to-sequence modeling with neural quality metrics across multiple instances of translation clients).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a translation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models, such as machine-learned translation models, neural utility metric models, etc. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
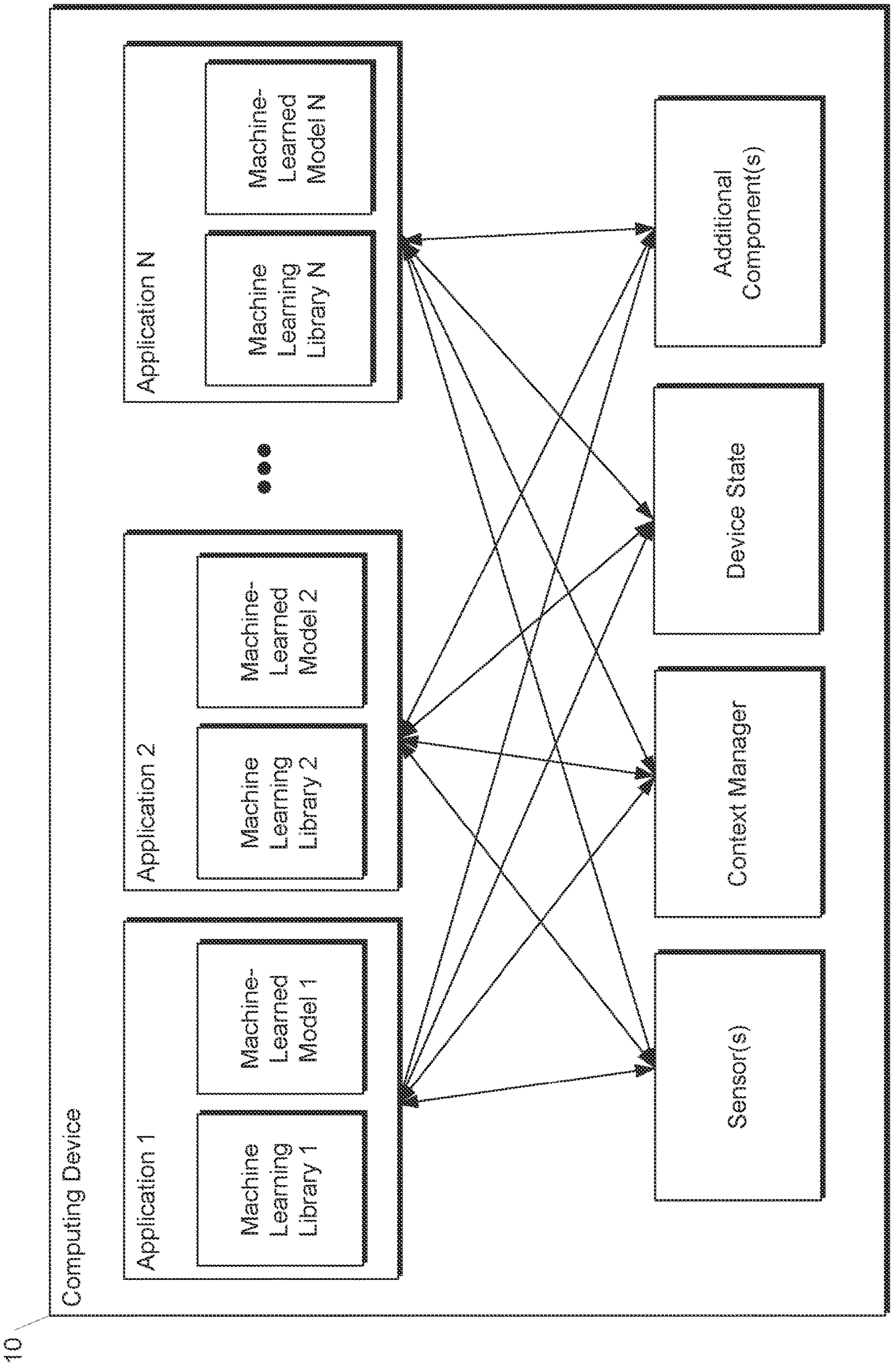
FIG. 1B depicts a block diagram of an example computing device that performs sequence-to-sequence modeling with neural quality metrics according to example embodiments of the present disclosure.

FIG. 1B depicts a block diagram of an example computing device 10 that performs sequence-to-sequence modeling with neural quality metrics according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
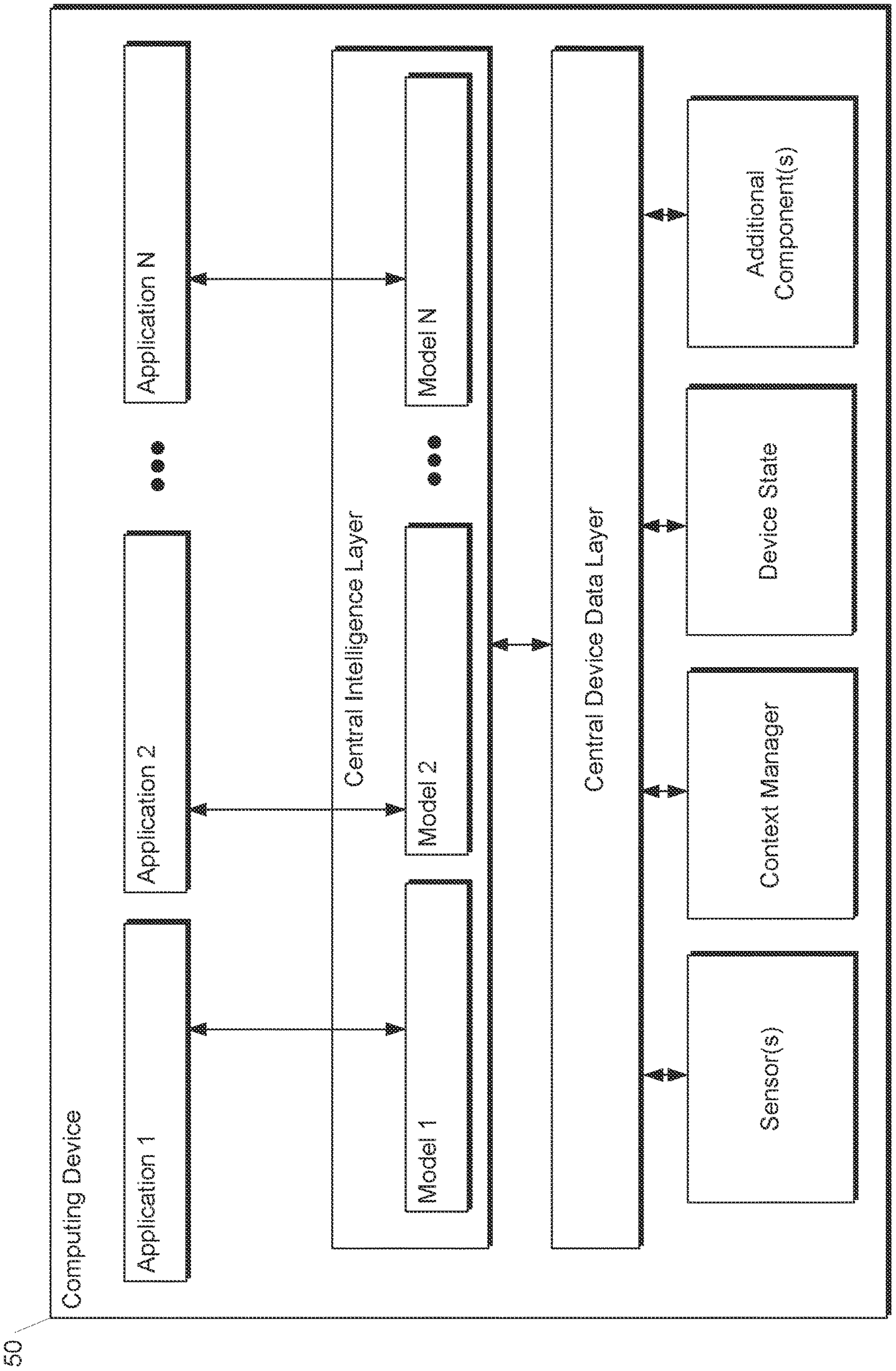
FIG. 1C depicts a block diagram of an example computing device that performs sequence-to-sequence modeling with neural quality metrics according to example embodiments of the present disclosure.

FIG. 1C depicts a block diagram of an example computing device 50 that performs sequence-to-sequence modeling with neural quality metrics according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
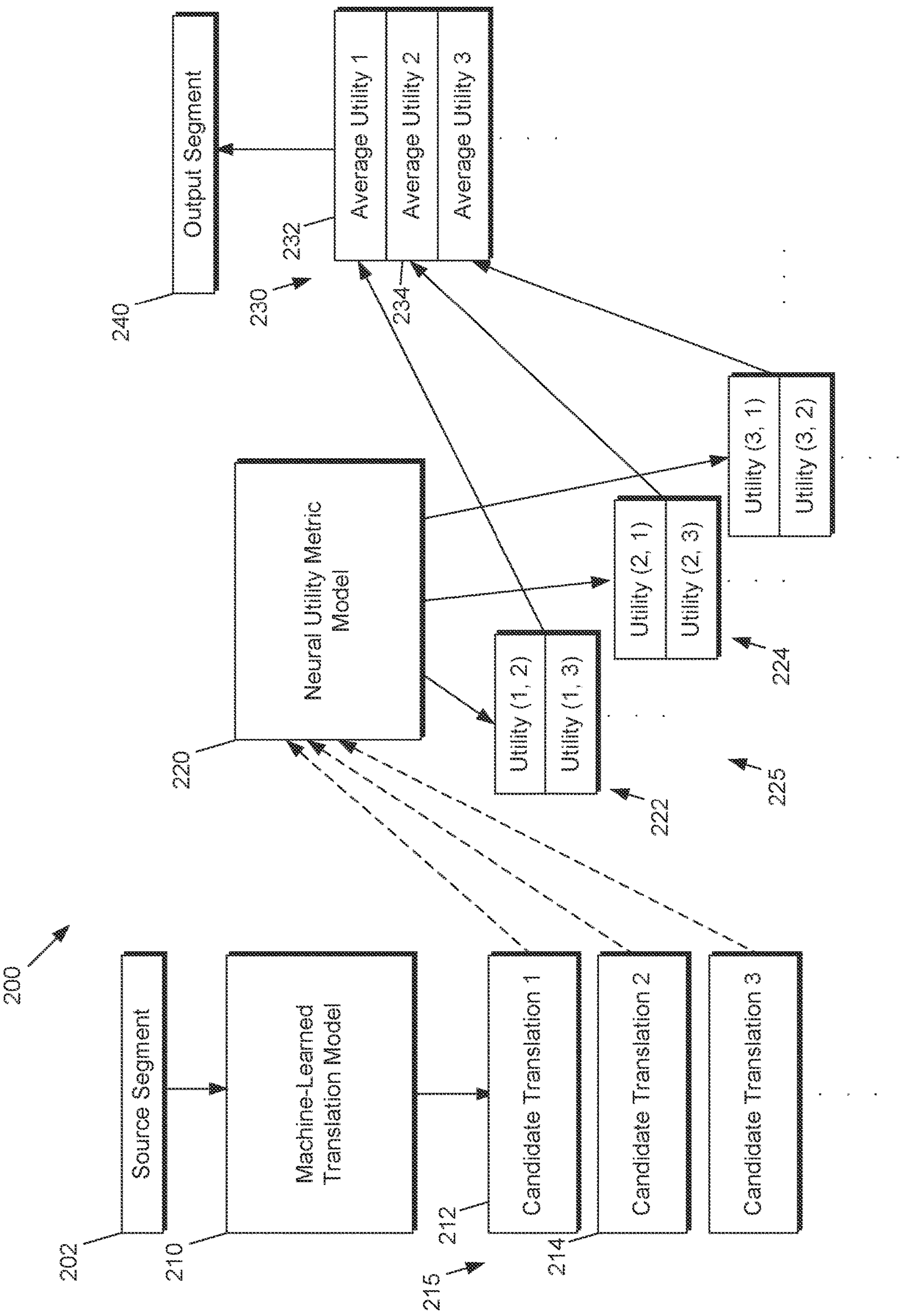
FIG. 2 illustrates a block diagram depicting operation of an example sequence-to-sequence model according to example embodiments of the present disclosure.

FIG. 2 illustrates a block diagram depicting operation of an example sequence-to-sequence model 200 according to example embodiments of the present disclosure. The model 200 can receive as input a source segment 202. For example, the source segment 202 can be or can include text data, such as one or more sentences. As one example, the source segment 202 can be received from a user of a computing system or computing device. The user may desire to translate the source segment 202, such as into another language. The source segment 202 can be provided to a machine-learned translation model 210. The translation model 210 can estimate probability of target segments given a source segment. For instance, the translation model 210 can be sampled to produce one or more candidate translations 215. For example, the translation model 210 can be sampled (e.g., by ancestral sampling) to produce a set of candidate translations 215 including first candidate translation 212, second candidate translation 214, and so on.

The candidate translations 215 can be provided to neural utility metric model 220. The neural utility metric model 220 can be configured to determine utilities 225 of candidate translations 215 based at least in part on reference translations. For instance, in some implementations, the neural utility metric model 220 can receive as input a pair including a candidate translation 215 and a reference translation. The neural utility metric model 220 can output, in response to receiving the input pair, a utility score 225 associated with the candidate translation 215 and based on the reference translation. For instance, if the reference translation is a human translation, the neural utility metric model 220 can score how well the candidate translation reflects the human translation. Intuitively, this may be a measure of how "believable" or "accurate" the candidate translation is. According to example aspects of the present disclosure, the neural utility metric model 220 can include one or more neural networks such that the neural utility metric model 220 is a machine-learned metric. The neural utility metrics can have improved correlation with human judgement. Examples of neural utility metric models 220 include the BLEURT metric and the COMET metric.

As illustrated in FIG. 2, in some implementations according to example aspects of the present disclosure, the reference translation can be another candidate translation 215. For instance, first utility scores 222 associated with first candidate translation 212 can be produced by neural utility metric model 220 when the first candidate translation 212 is used as the candidate translation input to the neural utility metric model 220 and each of the other candidate translations 215 (e.g., second candidate translation 214) is used as a reference translation input. In this way, a plurality of first utility scores 222 over the distribution of candidate translations 215 can be produced. Similarly, a plurality of second utility scores 224 can be produced by neural utility metric model 220 for second candidate translation 214, and so on.

The utility scores 225 associated with each candidate translation 215 can be averaged with respect to each candidate translation 215 to produce an average utility 230 associated with each candidate translation 215. For example, the first utility scores 222 associated with first candidate translation 212 can be averaged to produce first average utility 232. Similarly, the second utility scores 224 associated with second candidate translation 214 can be averaged to produce second average utility 234, and so on. The candidate translation 215 with the highest average utility 230 can be selected as the output segment 240. For instance, the candidate translation 215 having the highest average utility 230 can be closely correlated with human judgement, and is expected to be a high quality translation.

Figure 3:
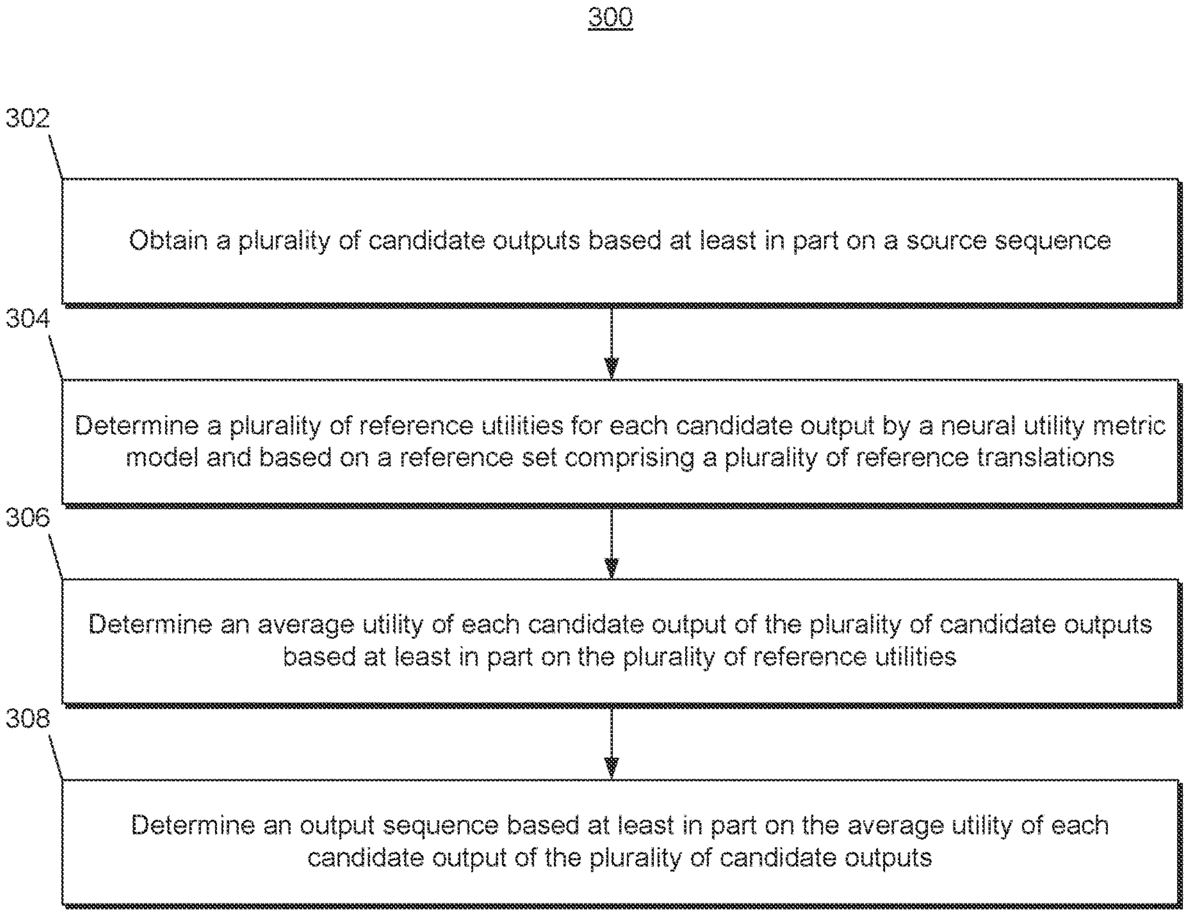
FIG. 3 depicts a flow chart diagram of an example method for translating a source sequence with improved quality according to example embodiments of the present disclosure.

FIG. 3 depicts a flow chart diagram of an example method 300 for translating a source sequence with improved quality according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

The computer-implemented method 300 can include, at 302, obtaining a plurality of candidate outputs based at least in part on a source sequence. In some implementations, the source sequence can be or can include text data including one or more sentences. For instance, a set of hypotheses can be sampled from a machine translation model. In some implementations, obtaining the plurality of candidate outputs includes inputting the source sequence into a machine-learned translation model configured to estimate the probability of a target segment given a source segment and receiving the plurality of candidate outputs as output from the machine-learned translation model. For instance, the machine-learned translation model $P_{model}(y|x)$ can estimate the probability of a target segment y given a source segment x. For instance, in some implementations, the machine-learned translation model can be or can include a transformer model. A plurality of candidate outputs (e.g., target segments) can be obtained from the source segment by repeatedly sampling from the model (e.g., by ancestral sampling).

The computer-implemented method 300 can include, at 304, determining a plurality of reference utilities for each candidate output by a neural utility metric model and based on a reference set comprising a plurality of reference translations. For instance, in some cases, it would be desirable to select the best candidate output based on its utility with respect to a distribution over human reference translations. However, the distribution over human reference translations may be unknown. For instance, it may not be possible to obtain human reference translations. Thus, a distribution over samples from the machine-learned translation model can provide a good approximation of the human reference translation distribution. Because it is intractable to integrate over the space of all sequences, a set of pseudo-references is sampled from the machine-learned translation model to act as the reference set. In some implementations, the reference set can be or can include the plurality of candidate outputs. For instance, the same set can be used as the candidates and the distribution.

The neural utility metric model can be configured to determine a utility of a candidate translation based at least in part on a reference translation. For instance, in some implementations, the neural utility metric model can receive as input a pair including a candidate translation and a reference translation. The neural utility metric model can output, in response to receiving the input pair, a utility score associated with the candidate translation and based on the reference translation. For instance, if the reference translation is a human translation, the neural utility metric model can score how well the candidate translation reflects the human translation. Intuitively, this may be a measure of how "believable" or "accurate" the candidate translation is. According to example aspects of the present disclosure, the neural utility metric model can include one or more neural networks such that the neural utility metric model is a machine-learned metric. The neural utility metrics can have improved correlation with human judgement.

Examples of neural utility metric models include the BLEURT metric and the COMET metric. For instance, utility metrics such as BLEURT or COMET may rank a human translation higher than translations from machine-learned translation models. The neural utility metric models can include so-called "first generation" neural utility metric models, which use neural models to extract pretrained sentence and word representations to compute distances indicative of semantic proximity, such as BertScore and/or YiSi. The neural utility metric models may also be so-called "second generation" models, including BLEURT and COMET, which fine-tune the neural models on human judgements, such as through regression or ranking tasks.

The computer-implemented method 300 can include, at 306, determining an average utility of each candidate output of the plurality of candidate outputs based at least in part on the plurality of reference utilities. In some implementations, determining the average utility of each candidate output can include averaging the plurality of reference utilities for each candidate output. For example, in some implementations, the neural utility metric model can output a utility score for each candidate translation paired with each of the other candidate translations as a reference translations to collect a plurality of reference utilities for the given candidate translation. This plurality of reference utilities can be averaged such that the average utility reflects the utility score over all candidate outputs. This average utility score thus serves as a proxy for the utility over human references.

The computer-implemented method 300 can include, at 308, determining an output sequence based at least in part on the average utility of each candidate output of the plurality of candidate outputs. For instance, in some implementations, determining the output sequence can include selecting the candidate output of the plurality of candidate outputs with the highest average utility as the output sequence. Once the average utility is determined for each candidate output, the candidate output with the highest average utility can be selected as the hypothesis with the best utility over the distribution of candidate outputs. For instance, in some implementations, the output sequence can include a translation of the text data from the source sequence. According to example aspects of the present disclosure, the output sequence will have improved quality and correlation to human translations than those produced by some existing systems.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for translating a source sequence with improved quality, the computer-implemented method comprising:

obtaining, by a computing system comprising one or more computing devices, a plurality of candidate outputs based at least in part on a source sequence, wherein the plurality of candidate outputs comprise one or more tokens sampled from a source sentence using a machine translation model, wherein the sampling comprises ancestral sampling;

determining, by the computing system, a plurality of reference utilities for each candidate output by a neural utility metric model and based on a reference set comprising a plurality of reference translations;

wherein determining the plurality of reference utilities comprises determining, by the computing system, respective utility scores output by the neural utility metric model for each candidate output as a candidate translation paired with each of the other candidate outputs as the reference translation;

wherein the computing system preserves a respective portion of the neural utility metric model associated with each candidate output, and wherein the computing system utilizes the preserved portion of the neural utility metric model associated with each candidate output, when determining the respective utility scores for each respective candidate output as the candidate translation paired with each of the other candidate outputs;

determining, by the computing system, an average utility of each candidate output of the plurality of candidate outputs based at least in part on the plurality of reference utilities;

wherein determining the average utility of each candidate output comprises:

averaging the respective utility scores respective to each candidate output to determine the average utility of each candidate output; and determining, by the computing system, an output sequence based at least in part on the average utility of each candidate output of the plurality of candidate outputs.

2. The computer-implemented method of claim 1, wherein obtaining the plurality of candidate outputs comprises:

inputting, by the computing system, the source sequence into a machine-learned translation model configured to estimate a probability of a target segment given a source segment; and receiving, by the computing system, the plurality of candidate outputs as output from the machine-learned translation model.

3. The computer-implemented method of claim 2, wherein the machine-learned translation model comprises a transformer model.

4. The computer-implemented method of claim 1, wherein determining the output sequence comprises selecting the candidate output of the plurality of candidate outputs with the highest average utility as the output sequence.

5. The computer-implemented method of claim 1, wherein the source sequence comprises text data comprising one or more sentences.

6. The computer-implemented method of claim 5, wherein the output sequence comprises a translation of the text data.

7. The computer-implemented method of claim 1, wherein the neural utility metric model comprises a BLEURT metric.

8. The computer-implemented method of claim 1, wherein the neural utility metric model comprises a COMET metric.

9. The computer-implemented method of claim 1, wherein the reference set comprises the plurality of candidate outputs.

10. A computing system, comprising:

one or more processors; and one or more non-transitory, computer-readable media storing instructions that, when implemented, cause the one or more processors to perform operations, the operations comprising:

obtaining a plurality of candidate outputs based at least in part on a source sequence, wherein the plurality of candidate outputs comprise one or more tokens sampled from a source sentence using a machine translation model, wherein the sampling comprises ancestral sampling;

determining a plurality of reference utilities for each candidate output by a neural utility metric model and based on a reference set comprising a plurality of reference translations;

wherein determining the plurality of reference utilities comprises determining, by the computing system, respective utility scores output by the neural utility metric model for each candidate output as a candidate translation paired with each of the other candidate outputs as the reference translation;

wherein the computing system preserves a respective portion of the neural utility metric model associated with each candidate output, and wherein the computing system utilizes the preserved portion of the neural utility metric model associated with each candidate output, when determining the respective utility scores for each respective candidate output as the candidate translation paired with each of the other candidate outputs;

determining an average utility of each candidate output of the plurality of candidate outputs based at least in part on the plurality of reference utilities;

wherein determining the average utility of each candidate output comprises:

averaging the respective utility scores respective to each candidate output to determine the average utility of each candidate output; and determining an output sequence based at least in part on the average utility of each candidate output of the plurality of candidate outputs.

11. The computing system of claim 10, wherein obtaining the plurality of candidate outputs comprises:

inputting, by the computing system, the source sequence into a machine-learned translation model configured to estimate a probability of a target segment given a source segment; and receiving, by the computing system, the plurality of candidate outputs as output from the machine-learned translation model.

12. The computing system of claim 11, wherein the machine-learned translation model comprises a transformer model.

13. The computing system of claim 10, wherein determining the output sequence comprises selecting the candidate output of the plurality of candidate outputs with the highest average utility as the output sequence.

14. The computing system of claim 10, wherein the source sequence comprises text data comprising one or more sentences.

15. The computing system of claim 14, wherein the output sequence comprises a translation of the text data.

16. The computing system of claim 10, wherein the neural utility metric model comprises a BLEURT metric.

17. The computing system of claim 10, wherein the neural utility metric model comprises a COMET metric.

18. The computing system of claim 10, wherein the reference set comprises the plurality of candidate outputs.

* * * * *